United States Patent [19]

Ducugnon

[11] Patent Number: 5,595,541
[45] Date of Patent: Jan. 21, 1997

[54] FLEXIBLE ADJUSTABLE SHAFT COUPLING

[75] Inventor: Jean Ducugnon, Caluire, France

[73] Assignee: P.I.V. S.A., Villeurbanne, France

[21] Appl. No.: 339,962

[22] Filed: Nov. 15, 1994

[30] Foreign Application Priority Data

Nov. 19, 1993 [FR] France .................. 93 14075

[51] Int. Cl.⁶ ............................................ F16D 3/44
[52] U.S. Cl. ..................................... 464/154; 464/87
[58] Field of Search ........................ 464/154, 87, 88, 464/92, 147, 153, 158

[56] References Cited

U.S. PATENT DOCUMENTS

| | | | |
|---|---|---|---|
| 2,270,583 | 1/1942 | Forton | 464/87 |
| 2,867,102 | 1/1959 | Williams | 464/154 X |
| 3,313,124 | 4/1967 | Filepp | 464/154 X |

FOREIGN PATENT DOCUMENTS

| | | | |
|---|---|---|---|
| 601009 | 12/1959 | Italy | 464/87 |
| 418643 | 3/1974 | U.S.S.R. | 464/87 |

Primary Examiner—John P. Darling
Assistant Examiner—Emmanual M. Marcelo
Attorney, Agent, or Firm—Herbert Dubno; Andrew Wilford

[57] ABSTRACT

A flexible coupling for two shafts rotatable generally about the same axis and having juxtaposed ends has respective end fittings fixed on the shaft ends and each having a radially outwardly directed outer surface, an elastically compressible sleeve having an inner surface engaging both outer surfaces and a radially outwardly directed outer surface and axially oppositely directed end surfaces, and rigid structure including at least one ring engaging the outer and end surfaces of the sleeve. A system is provided for pressing the structure against the outer and end surfaces of the sleeve for pressing the inner sleeve surface against the outer fitting surfaces with a variable force.

13 Claims, 10 Drawing Sheets

5,595,541

FLEXIBLE ADJUSTABLE SHAFT COUPLING

FIELD OF THE INVENTION

The present invention relates to a shaft coupling. More particularly this invention concerns a flexible shaft coupling for joining together two shafts that are not perfectly coaxial.

BACKGROUND OF THE INVENTION

When two shafts are not perfectly aligned to a common axis and must be coupled together, it is standard to use a flexible coupling that accommodates the misalignment, whether that be a lateral offset of one shaft axis to the other or a condition where the one shaft axis intersects the other at an angle approaching 180°. Such a flexible coupling can comprise at its simplest a flexible sleeve having one end fitted to one of the shafts and an opposite end to the other shaft.

Normally as described in German patent document 2,042, 260, German utility model 9,308,521, and French patent document 839,967 the two shaft ends are fitted with respective fittings whose outer surfaces are normally formed with radially outwardly directed teeth. The sleeve is split so it can be fitted over the end fittings and is internally formed with elongated teeth or ridges that fit with the teeth of the fittings, although a glue joint is also occasionally used. Normally a steel ring is fitted around the sleeve, with bumps on the ring fitting into recesses on the sleeve to maintain its position.

Installing such a coupling can be fairly difficult. Once installed it is possible for moisture and/or particles to get into the coupling to damage it. Furthermore once it is in place it is impossible to adjust it, in particular to compensate for material shrinkage or wear of the parts.

OBJECTS OF THE INVENTION

It is therefore an object of the present invention to provide an improved flexible shaft coupling.

Another object is the provision of such an improved flexible shaft coupling which overcomes the above-given disadvantages, that is which is easy to install, which keeps foreign matter out of the coupling, and which can be tightened after installation if necessary.

SUMMARY OF THE INVENTION

A flexible coupling for two shafts rotatable generally about the same axis and having juxtaposed ends has according to the invention respective end fittings fixed on the shaft ends and each having a radially outwardly directed outer surface, an elastically compressible sleeve having an inner surface engaging both outer surfaces and a radially outwardly directed outer surface and axially oppositely directed end surfaces, and rigid structure including at least one ring engaging the outer and end surfaces of the sleeve. A system is provided for pressing the structure against the outer and end surfaces of the sleeve for pressing the inner sleeve surface against the outer fitting surfaces with a variable force.

According to the invention the sleeve can consist of an outer sleeve of an elastomer or a similar relatively noncompressible material fitted to the rigid structure and having an inner surface and an inner sleeve engaging the outer fitting surfaces and having an outer surface engaging the inner surface of the outer sleeve in surface contact. This inner sleeve can be of a more rigid material that is wholly incompressible. It can have axially oppositely directed end surfaces that are axially spaced from the rigid structure so that the adjustment force is only axially effective on the outer sleeve. Alternately the sleeve can be a single piece.

In accordance with further features of the invention the rigid structure includes two such rings each having a generally cylindrical outer flange extending generally parallel to the axis and lying on the outer surface of the sleeve and a generally planar end flange extending generally perpendicular to the axis and lying on the end surfaces of the sleeve. A plurality of axially extending and generally angularly equi-spaced bolts each have one end seated in one of the rings and an opposite end seated in the other ring. To accommodate these bolts the sleeve can be formed with axially throughgoing passages through which the bolts pass. It is also possible for the sleeve to be formed by a plurality of angularly spaced sleeve segments separated by gaps through which the bolts pass. These segments are bonded to at least one of the rings. In another arrangement the bolts are radially wholly outside the sleeve, running between threaded holes in one outer flange and bores in the other outer flange.

To accommodate substantial shaft misalignment swivel mounts are provided between the ends of the bolts and the rings so that the bolts can tip relative to the rings. In order to establish an accurate sleeve compression rigid spacers are provided between inner end faces of the outer flanges. Thus the bolts are pulled tight until the spacer is clamped. In another arrangement a rigid cylindrical tube surrounds the sleeve between the rings. In this system each ring outer flange is axially relatively short and thin and aligned with the rigid tube and each ring inner flange is relatively thick. In any system a flexible and compressible seal ring is fitted between each outer flange and the respective sleeve end face.

This system has several considerable advantages. Unlike the prior-art systems the rigidity or elasticity of the coupling of this invention can be adjusted for a particular application or to compensate for wear or material shrinkage. The adjustment can be done simply with a screwdriver or wrench without having to disassemble the coupling at all. The two L-section rings substantially completely enclose and protect the joint, keeping moisture and particles out of the screwthreads of the adjustment bolts. The spacing of the rings can be used to gauge the adjustment, or a torque wrench can be applied to the bolts. The coupling of this invention will operate silently and will not need lubrication. It can be adapted readily to shafts of virtually any size and can transmit torques that are small or large.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
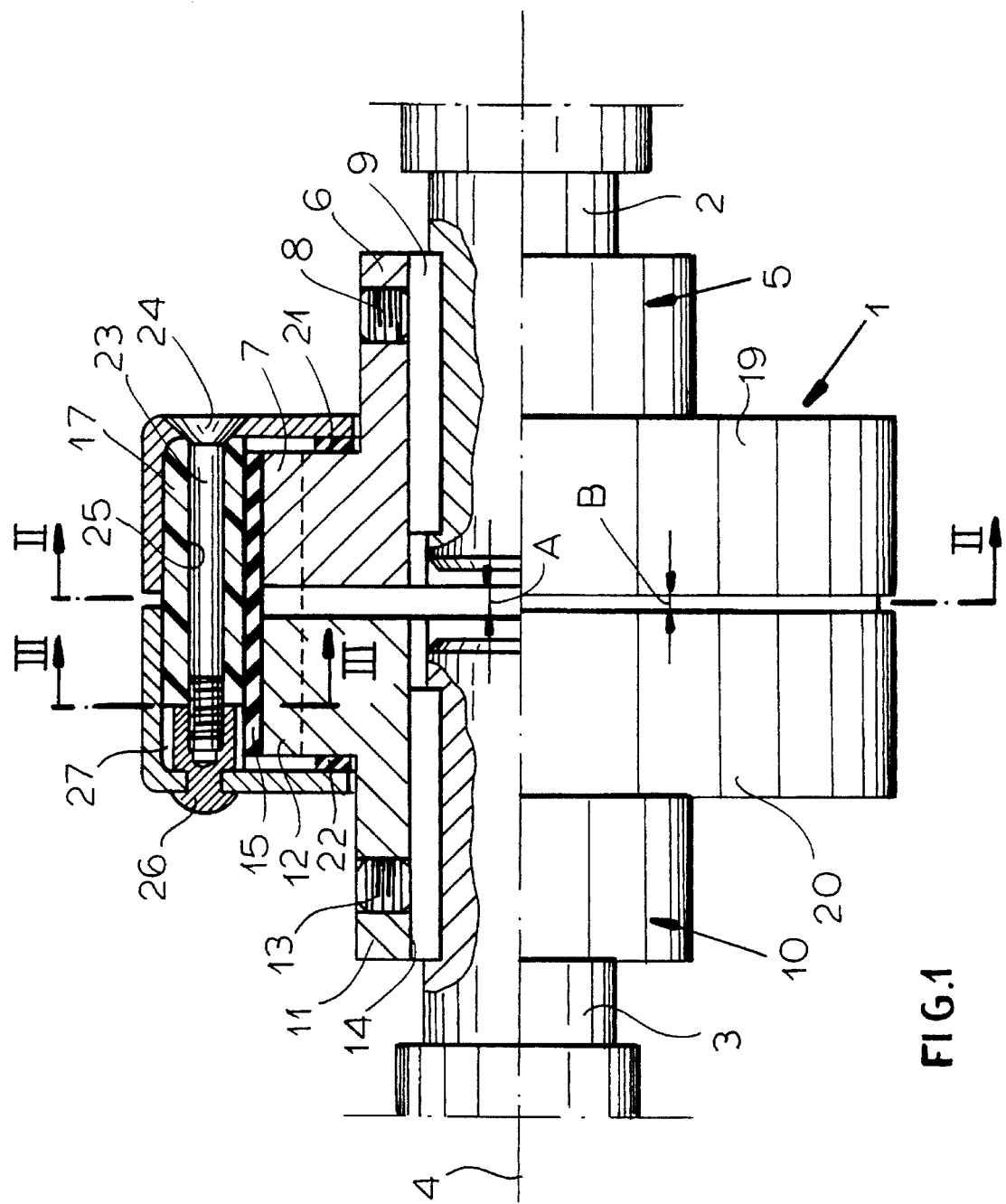
FIG. 1 is a side view partly in axial section as indicated by line I—I of FIG. 2 of a first embodiment of the coupling of this invention.
Figure 3:
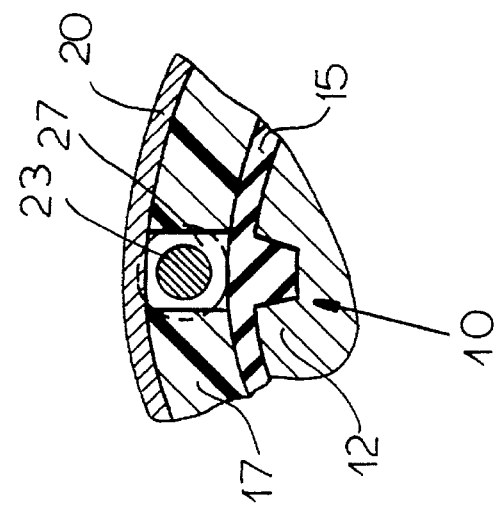
FIG. 3 is a section taken along line III—III of FIG. 1 of a detail of the first embodiment.
Figure 2:
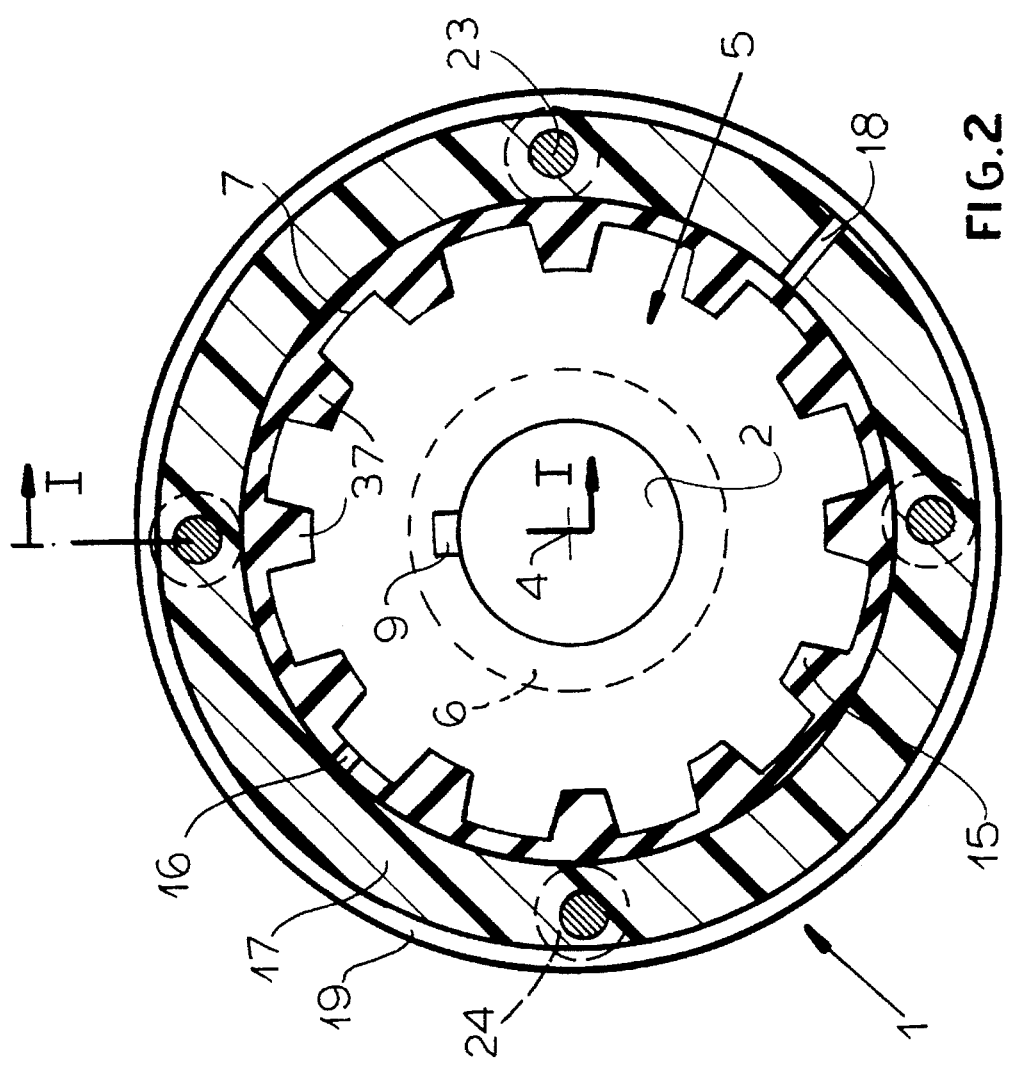
FIG. 2 is a section taken along line II—II of FIG. 1.

As seen in FIGS. 1 through 3 a flexible shaft coupling 1 serves to join a drive shaft 2 with a driven shaft 3. Both shafts 2 and 3 are generally centered on a common axis 4 although in practice the axis of either shaft can deviate slightly from the axis 4. The shaft 2 carries an end fitting 5 having a hub 6 secured solidly in place by a set screw 8 and key 9 and having radially outwardly directed and angularly equispaced teeth 7. The shaft 3 has a similar fitting 10 having a hub 11 with a set screw 13 and key 14 and identical teeth 12. Each tooth 7 is axially aligned with a respective one of the teeth 12 and spaced axially from it by a distance A.

A tubular coupling sleeve 15 is formed with radially inwardly projecting and axially throughgoing teeth or ridges 37 that interfit and mesh with the teeth 7 and 12. This sleeve 15 is formed with an axially throughgoing split 16 that allows it to be opened up and fitted around the two end fittings 5 and 10. Surrounding this sleeve 15 is an outer split sleeve 17 of a relatively incompressible elastomer whose axially throughgoing split 18 is arranged diametrally opposite the split 16 of the sleeve 15. The cylindrical inner surface of the sleeve 17 bears radially inward on the cylindrical outer surface of the sleeve 15 in full surface contact.

A pair of similar L-section compression rings 19 and 20 are fitted over sleeve 17. Each ring 19 and 20 is rigid and made of sheet metal with a planar inner flange extending perpendicular to the axis 4 and having an inner edge spaced radially slightly outward from the respective hub 6 or 11 and spaced axially from the respective outer face of the respective element 5 or 10, with a seal washer 21 or 22 engaged axially between each inner flange and the respective element 5 or 10. Each ring 19 and 20 further has a cylindrical outer flange lying against the cylindrical outer surface of the sleeve 17 and having an end that is spaced axially from the end of the other outer flange by a distance B that is slightly shorter than the distance A.

The sleeve 17 is formed with four angularly equispaced and axially throughgoing holes or passages 25 that each receive a bolt 23 having a head 24 seated in the one ring 19 and a nut 26 riveted to the other ring 20. The sleeve 17 is formed with cut-outs 27 to accommodate the nuts 26.

It is therefore possible by tightening the bolts 23 with a screwdriver or wrench to axially compress the sleeve 17. Since the outer surface of this sleeve 17 is confined by the outer flanges of the rings 19 and 20, it will therefore deform radially inward, increasing compression of the coupling sleeve 15 and, therefore, tightening the coupling. Thus it is possible not only to adjust the stiffness of the coupling during installation, but later to go back and tighten it again to compensate for wear, material shrinkage, or the like.

The range of adjustment is determined by the softness of the materials forming the parts 15 and 17, and by the spacing B. The seal rings or washers 21 and 22 are quite soft so that they do not significantly affect the tightening operation; instead they primarily serve to keep dust and moisture out of the assembly so that, for instance, the bolts 23 do not rust.

Figure 4:
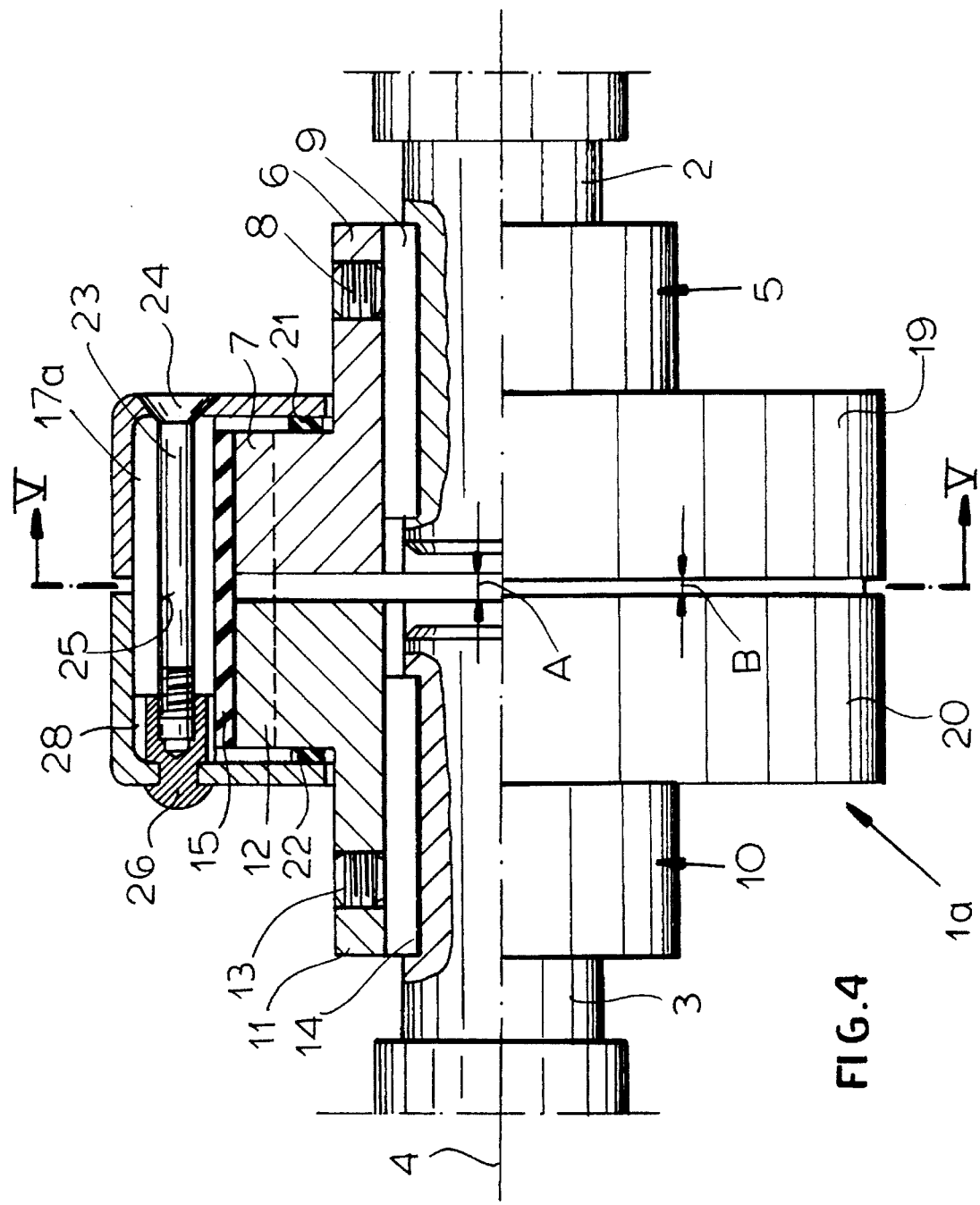
FIG. 4 is a view like FIG. 1 of a second embodiment of the invention.
Figure 5:
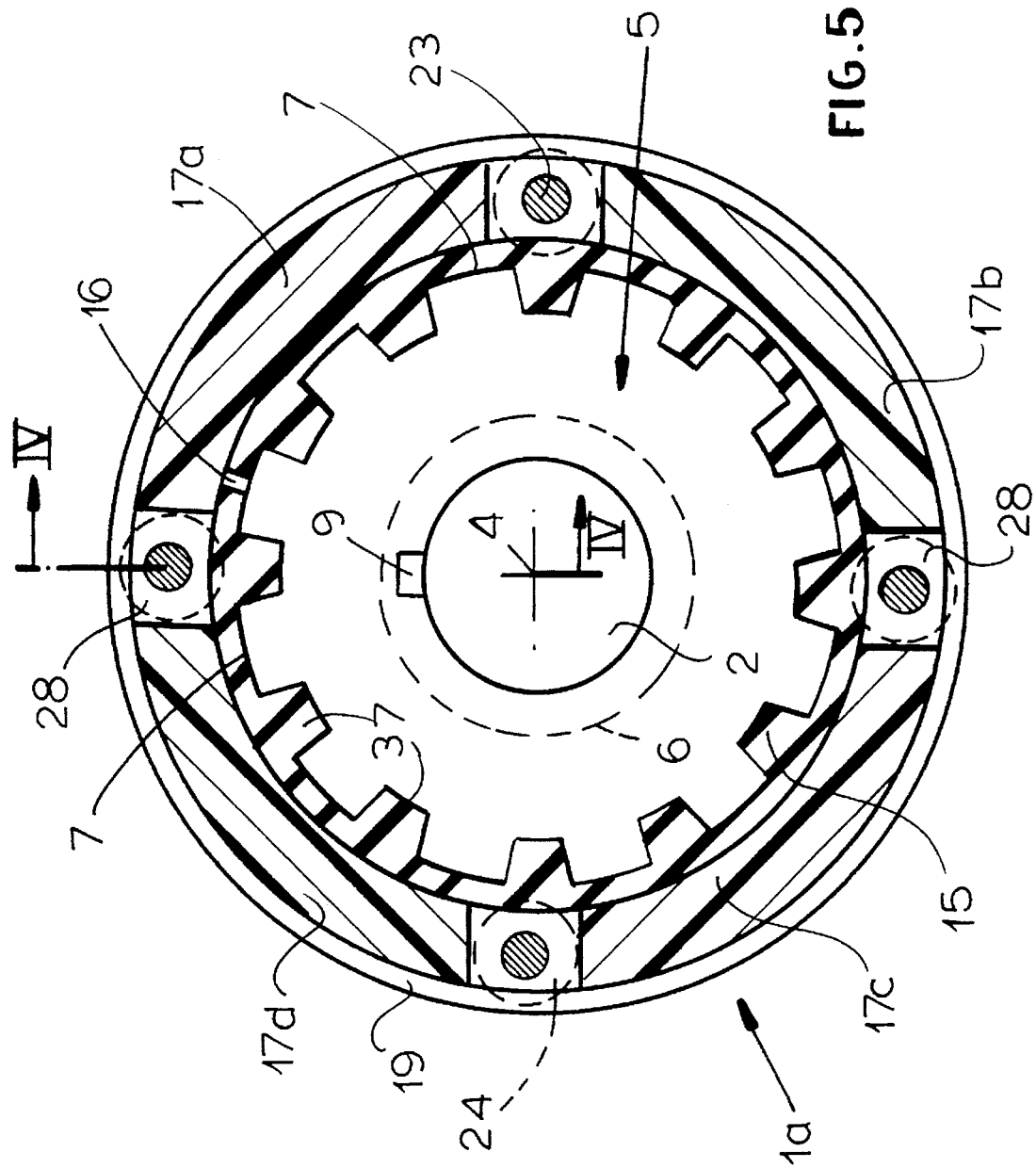
FIG. 5 is a section taken along line V—V of FIG. 4.

FIGS. 4 and 5 show a coupling 1a where, instead of a one-piece element 17, four segments 17a, 17b, 17c, and 17d separated by angularly spaced gaps 28 form the compression sleeve. Each of the segments 17a–d is formed as somewhat less than a quarter of a cylindrical tube and the bolts 23 are accommodated by the gaps 28. For ease of handling the segments 17a–d are normally glued inside one of the clamping rings 19 or 20.

Figure 6:
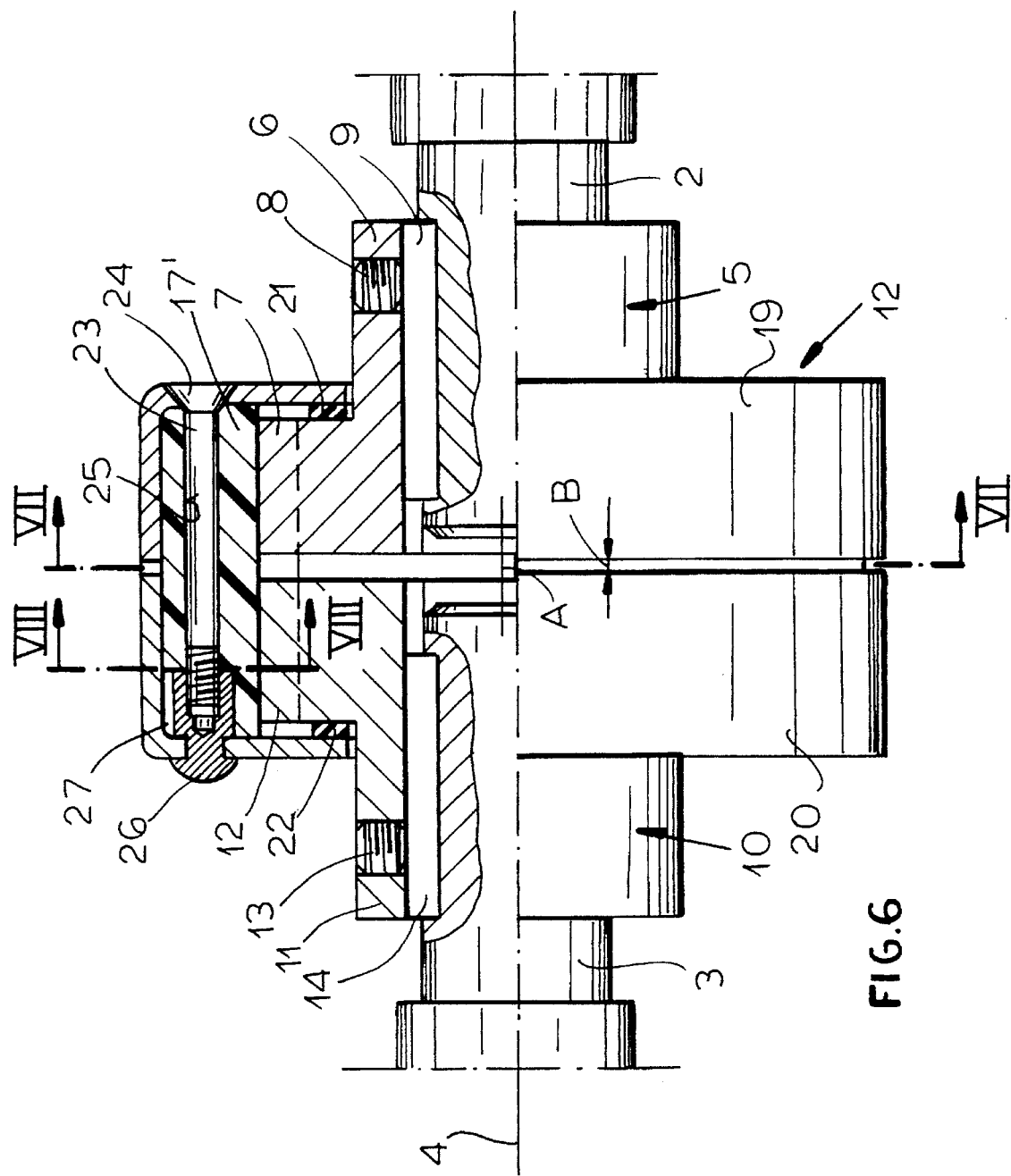
FIG. 6 is a view like FIG. 1 of a third embodiment of the invention.
Figure 8:
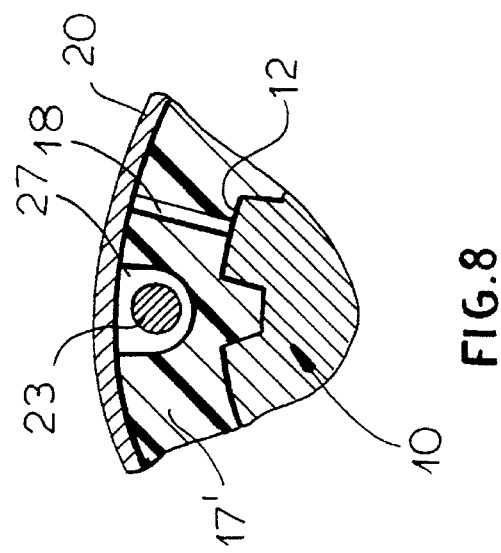
FIG. 8 is a section taken along line VIII—VIII of FIG. 6 of a detail of the third embodiment.
Figure 7:
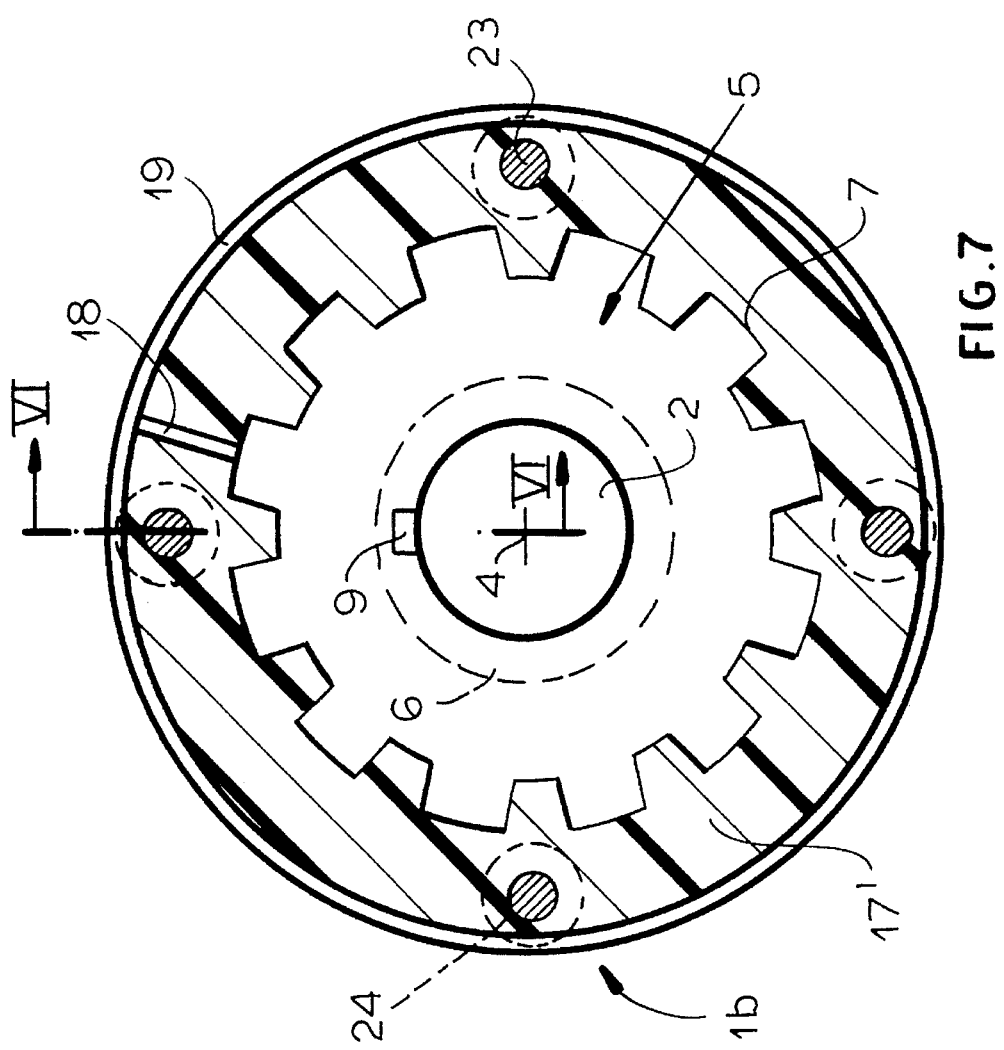
FIG. 7 is a section taken along line VII—VII of FIG. 6.

The arrangement of FIGS. 6 through 8 is a coupling 1b that uses a single compression sleeve 17' instead of the two parts 17 and 15. Thus the outer surface of the compression/ connection sleeve 17' engages the inner surfaces of the outer flanges of the compression rings 19 and 20 so that when the sleeve 17' is compressed axially it must inherently swell radially inward, tightening it on the teeth 7 and 12.

Figure 9:
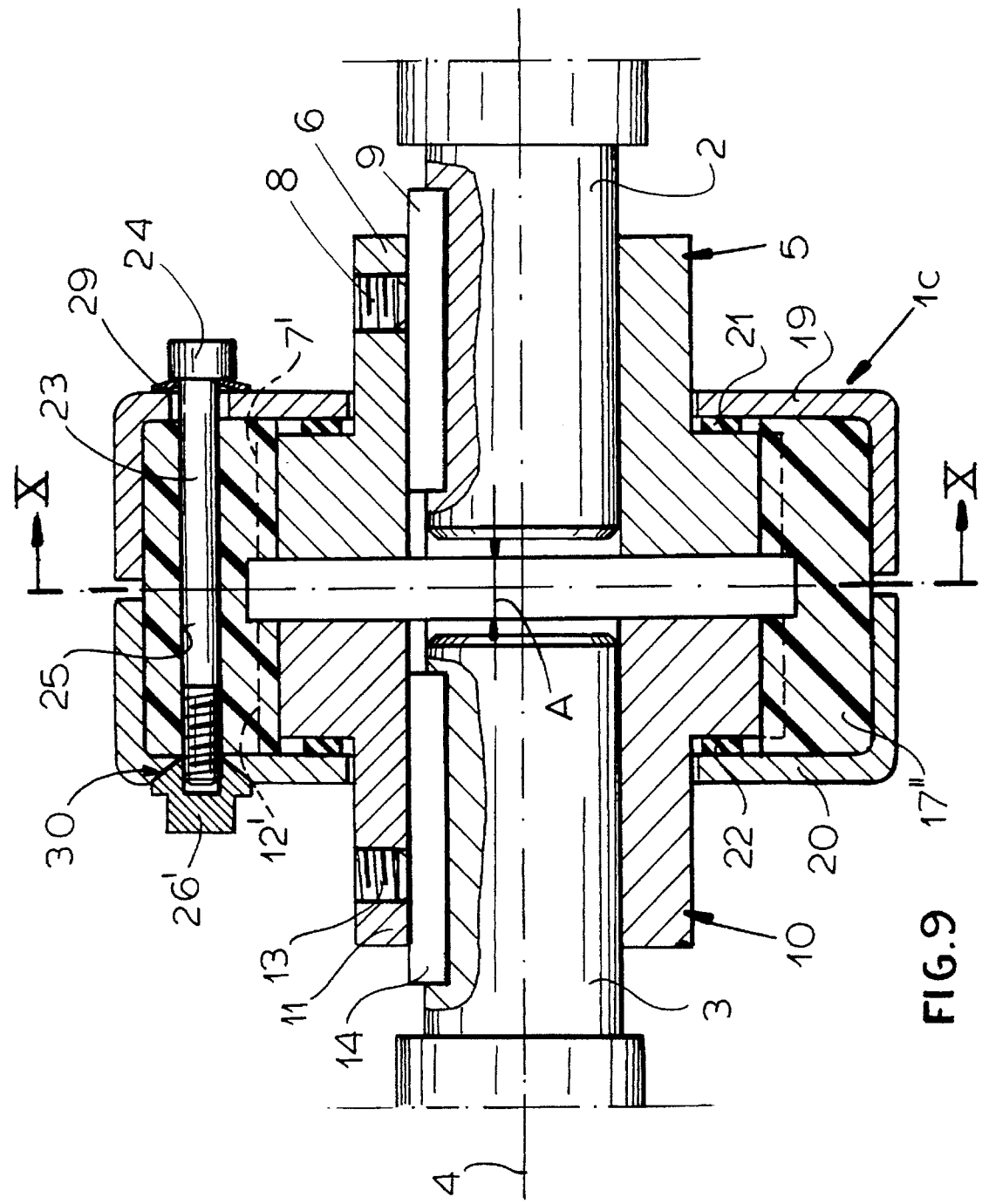
FIGS. 9, 11, and 13 are views like FIG. 1 of fourth, fifth, and sixth embodiments of the invention.
Figure 10:
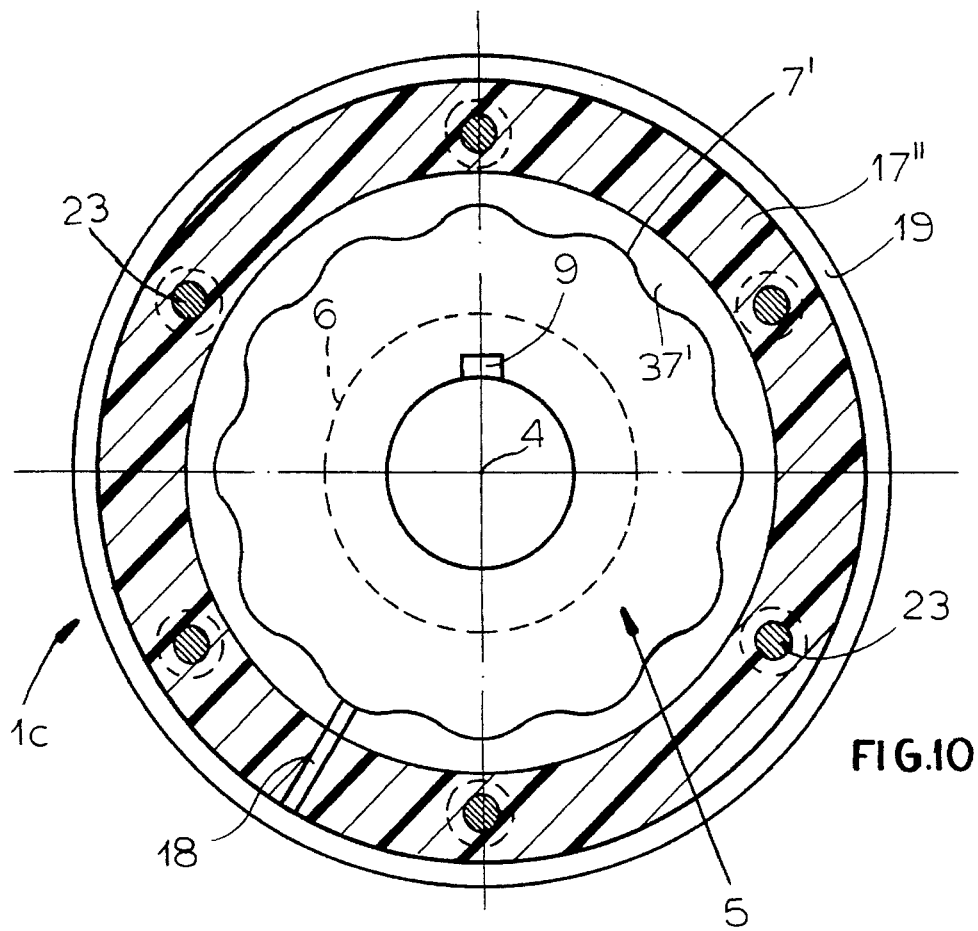
FIG. 10, 12, and 14 are sections taken respectively along lines X—X, XII—XII, and XIV—XIV of respective FIGS. 9, 11, and 13.

In FIGS. 9 and 10 the end fittings 5 and 10 of the coupling 1c have rounded teeth 7' and 12' and the one-part compression/connection sleeve 17" has complementarily formed teeth 37'. Furthermore the head 24 of the bolt 23 bears via a rounded spring washer 29 on the ring 19 while the nut 26' has a face bearing complementarily on a part-spherical seat 30 in the ring 20. Such an arrangement can compensate for substantially greater misalignments between the axis of the shaft 2 and that of the shaft 3 than the systems described above.

Figure 12:
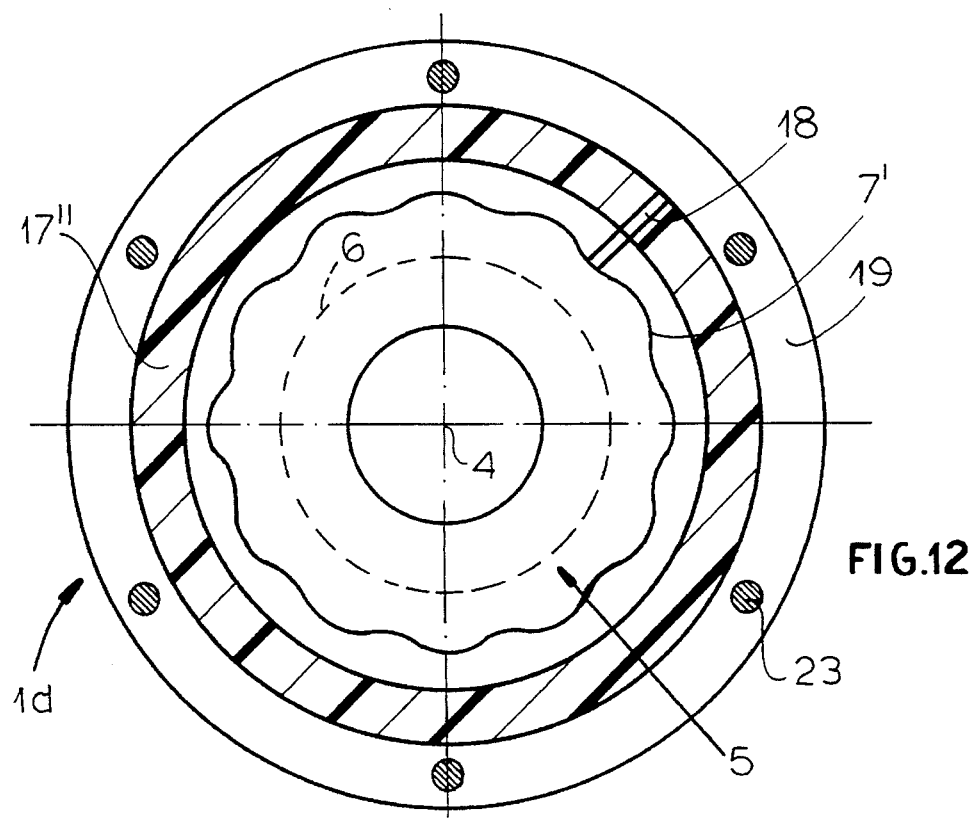
Figure 11:
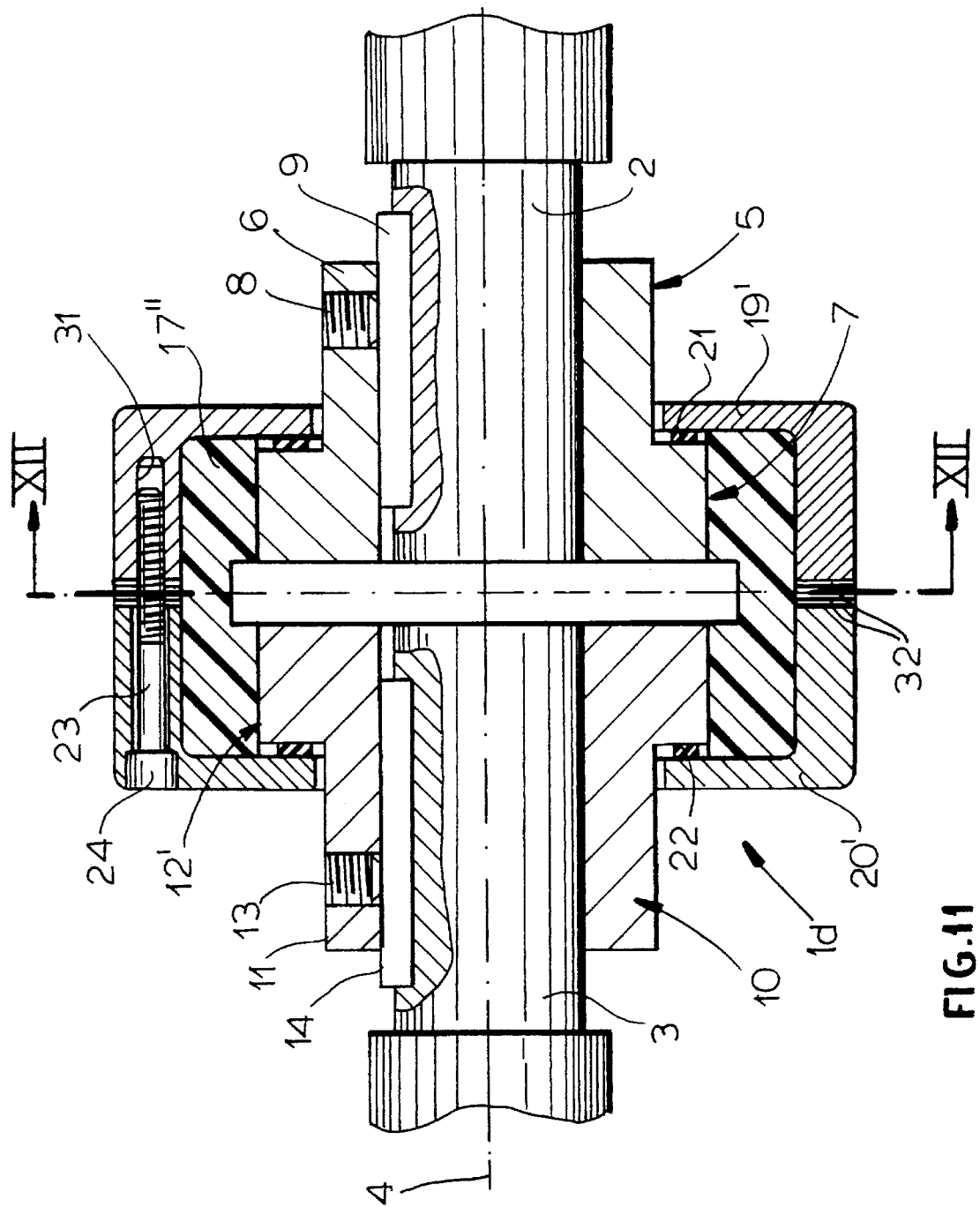

The coupling 1d of FIGS. 11 and 12 has rounded teeth 7' and 12' and a one-piece sleeve 17" as in FIGS. 9 and 10, but here the bolts 23 do not pass through the sleeve 17" but pass directly from the one ring 20' to the other ring 19' which itself is formed with blind threaded holes 31 for the bolts 23. Spacers 32 are provided between the confronting edges of the rings 19' and 20'. Here the bolts 23 are tightened until the two rings 19' and 20' bear solidly against each other via the spacers 32.

Figure 13:
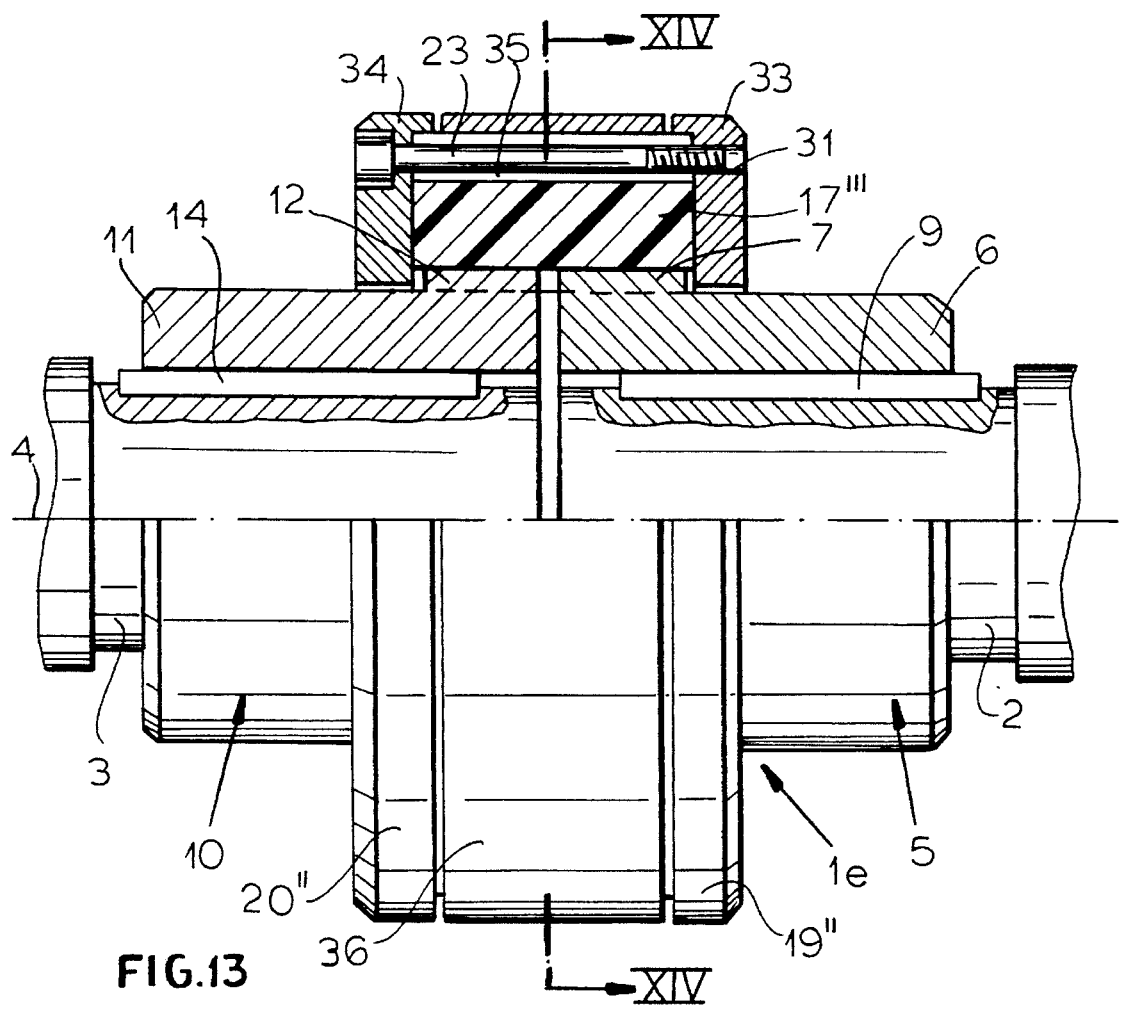
Figure 14:
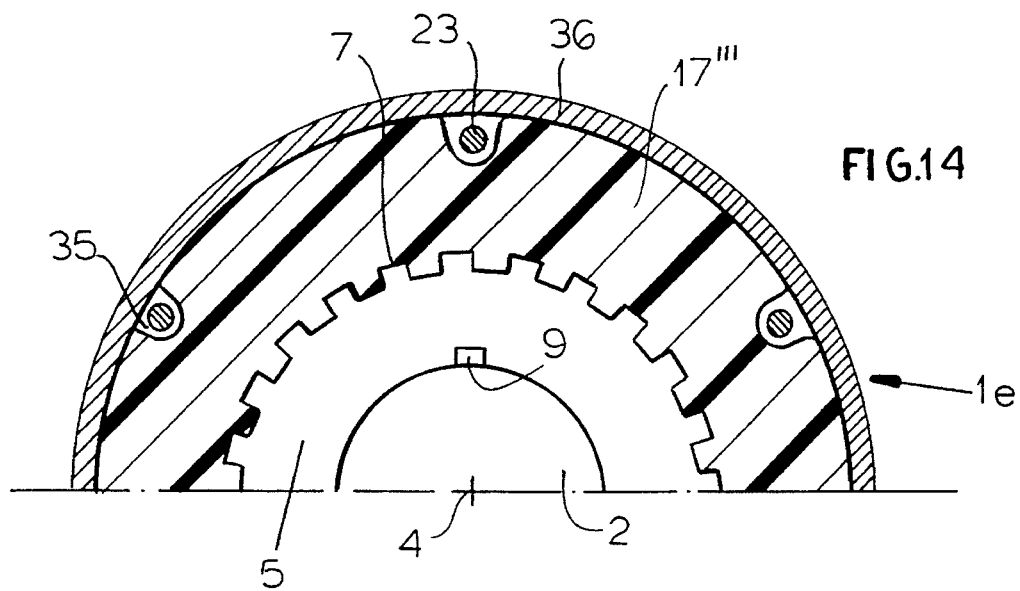

In FIGS. 13 and 14 the coupling 1e has a one-piece compression/connection sleeve 17'" formed with six radially outwardly open and axially throughgoing notches 35 in which sit the bolts 23. The clamping rings 19" and 20" here have very short inner flanges 33 and 34 but between them is a separate stiff sleeve or ring 36 that normally bears on the outer surface of the sleeve 17'". The bolts 23 are seated in the one ring 20" and screwed into threaded bores 31 of the other ring 19". In this arrangement the extent of compression of the element 17'" can be controlled by the length of the sleeve 36, since in normal use the rings 19" and 20" are pressed axially directly against its ends. Alternately of course spacer washers 32 as in FIGS. 11 and 12 could also be used here. The main advantage of this system is that the considerable volume of the element 17'" allows it to be compressed quite a bit, giving a wide range of adjustment to the coupling 1e.

The invention is not limited to the above-described embodiments. Variations are possible:

The teeth can have any desired shape. A squarer shape is used with systems with little misalignment while a rounded shape is used when the alignment could be considerable.

The teeth could be eliminated altogether and replaced with a bond, for instance a glue joint.

The teeth could be eliminated and a friction connection used between the end fittings and the compression sleeve.

The bolts could be replaced with other clamping elements working either axially or radially. For example bolts could be used that converge toward the center of the elastomeric ring.

I claim:

1. A flexible coupling for two shafts rotatable generally about a common axis and having juxtaposed shaft ends, the coupling comprising:

respective end fittings fixed on the shaft ends and each having a radially outwardly directed outer surface formed with respective externally directed teeth;

an elastically compressible sleeve having an inner surface formed with inwardly directed teeth meshing with the teeth of both outer surfaces, a radially outwardly directed outer surface, and axially oppositely directed end surfaces;

rigid structure including a pair of axially spaced rings engaging the outer and end surfaces of the sleeve; and adjusting means including a plurality of axially extending and generally angularly equispaced bolts each having one end seated in one of the rings and an opposite end seated in the other ring for pressing the structure against the outer and end surfaces of the sleeve and thereby pressing the inner sleeve surface against the outer fitting surfaces with a variable force.

2. The flexible shaft coupling defined in claim 1 wherein the sleeve consists of an outer sleeve fitted to the rigid structure and having an inner surface and an inner sleeve engaging the outer fitting surfaces and having an outer surface engaging the inner surface of the outer sleeve in surface contact.

3. The flexible shaft coupling defined in claim 2 wherein the inner sleeve has axially oppositely directed end surfaces that are axially spaced from the rigid structure, whereby the adjusting means is only axially effective on the outer sleeve.

4. The flexible shaft coupling defined in claim 1 wherein each ring has a generally cylindrical outer flange extending generally parallel to the axis and lying on the outer surface of the sleeve and a generally planar end flange extending generally perpendicular to the axis and lying on the end surface of the sleeve.

5. The flexible shaft coupling defined in claim 4 wherein each ring outer flange is axially relatively short and thin and aligned with the rigid tube and each ring inner flange is relatively thick.

6. The flexible shaft coupling defined in claim 1 wherein the sleeve is formed with axially throughgoing passages through which the bolts pass.

7. The flexible shaft coupling defined in claim 1 wherein the sleeve is formed by a plurality of angularly spaced sleeve segments separated by gaps through which the bolts pass.

8. The flexible shaft coupling defined in claim 7 wherein the segments are bonded to at least one of the rings.

9. The flexible shaft coupling defined in claim 1, further comprising swivel mounts between the ends of the bolts and the rings, whereby the bolts can tip relative to the rings.

10. The flexible shaft coupling defined in claim 1 wherein the bolts are radially wholly outside the sleeve and one of the rings is formed with threaded holes in which the bolts are seated.

11. The flexible shaft coupling defined in claim 1 wherein the rings have axially confronting inner end faces, the coupling further comprising rigid spacers between the inner end faces.

12. The flexible shaft coupling defined in claim 1 wherein the structure further includes a rigid cylindrical tube surrounding the sleeve between the rings.

13. The flexible shaft coupling defined in claim 1, further comprising a flexible and compressible seal ring between each outer flange and the respective sleeve end face.

* * * * *